(12) United States Patent
Chono et al.

(10) Patent No.: US 10,085,025 B2
(45) Date of Patent: *Sep. 25, 2018

(54) IMAGE QUANTIZATION PARAMETER ENCODING METHOD AND IMAGE QUANTIZATION PARAMETER DECODING METHOD

(71) Applicant: NEC Corporation, Tokyo (JP)

(72) Inventors: Keiichi Chono, Tokyo (JP); Hirofumi Aoki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/655,500

(22) Filed: Jul. 20, 2017

(65) Prior Publication Data

US 2017/0324957 A1 Nov. 9, 2017

Related U.S. Application Data

(63) Continuation of application No. 15/238,587, filed on Aug. 16, 2016, now Pat. No. 9,749,634, which is a
(Continued)

(30) Foreign Application Priority Data

Jul. 12, 2011 (JP) ................................ 2011-153427

(51) Int. Cl.
*H04N 19/126* (2014.01)
*H04N 19/13* (2014.01)
(Continued)

(52) U.S. Cl.
CPC ........... *H04N 19/126* (2014.11); *H04N 19/13* (2014.11); *H04N 19/154* (2014.11);
(Continued)

(58) Field of Classification Search
CPC ............. H04N 19/00951; H04N 19/13; H04N 19/463; H04N 19/126; H04N 19/154; H04N 19/1887; H04N 19/91; H04N 19/44

See application file for complete search history.

(56) References Cited

U.S. PATENT DOCUMENTS 7,336,720 B2  2/2008  Martemyanov et al.
7,535,387 B1  5/2009  Delva
(Continued)

FOREIGN PATENT DOCUMENTS

CA   2 834 193 A1   1/2013
CN    1873809 A    12/2006
(Continued)

OTHER PUBLICATIONS

Marpe et al. "Context-Based Adaptive Binary Arithmetic Coding in the H.264-AVC Video Compression Standard". IEEE Transactions on Circuits and Systems for Video Technology, vol. 13, No. 7, Jul. 2003, pp. 620-636.
(Continued)

*Primary Examiner* — Zhihan Zhou
(74) *Attorney, Agent, or Firm* — Finnegan, Henderson, Farabow, Garrett & Dunner, L.L.P.

(57) ABSTRACT

Disclosed are image quantization parameter decoding method and systems for decoding a quantization parameter for a video decoding process that is based on context-based adaptive binary arithmetic coding. In one embodiment, an image quantization parameter decoding method includes binary-arithmetic-decoding a first bin indicating whether or not a delta quantization parameter is significant, other bins, which are subsequent to the first bin, indicating an absolute value of the delta quantization parameter, and a sign bin, which is subsequent to the other bins, indicating whether the delta quantization parameter is positive or negative. The
(Continued)

method further includes generating a delta quantization parameter by de-binarizing the first bin, the other bins and the sign bin. The method further includes generating a re-constructed quantization parameter by adding a predicted quantization parameter to the delta quantization parameter. The binary-arithmetic-decoding is performed using contexts for the first bin and the other bins, and using no context for the sign bin.

2 Claims, 13 Drawing Sheets

Related U.S. Application Data continuation of application No. 14/112,978, filed as application No. PCT/JP2012/003897 on Jun. 14, 2012, now Pat. No. 9,451,259.

(51) Int. Cl.
  *H04N 19/463* (2014.01)
  *H04N 19/91* (2014.01)
  *H04N 19/154* (2014.01)
  *H04N 19/169* (2014.01)
  *H04N 19/44* (2014.01)

(52) U.S. Cl.
  CPC ......... *H04N 19/1887* (2014.11); *H04N 19/44* (2014.11); *H04N 19/463* (2014.11); *H04N 19/91* (2014.11)

(56) References Cited

U.S. PATENT DOCUMENTS

| | | | |
|---|---|---|---|
| 2003/0081850 A1 | 5/2003 | Karczewicz et al. | |
| 2004/0085233 A1 | 5/2004 | Linzer et al. | |
| 2006/0280371 A1* | 12/2006 | Shimazaki | H04N 19/61 382/239 |
| 2007/0291847 A1 | 12/2007 | Shimauchi et al. | |
| 2009/0180536 A1 | 7/2009 | Shimofure | |
| 2011/0103471 A1 | 5/2011 | Demos et al. | |
| 2012/0177109 A1* | 7/2012 | Ye | H04N 19/197 375/240.03 |
| 2012/0320971 A1* | 12/2012 | Xu | H03M 7/4018 375/240.03 |
| 2012/0328004 A1* | 12/2012 | Coban | H04N 19/105 375/240.03 |

FOREIGN PATENT DOCUMENTS

| | | |
|---|---|---|
| CN | 1878309 A | 12/2006 |
| EP | 1 624 580 A1 | 2/2006 |
| EP | 1 699 243 A2 | 9/2006 |
| EP | 2 124 343 A1 | 11/2009 |
| JP | 2007-020141 | 1/2007 |
| RU | 2 350 040 C1 | 3/2009 |

OTHER PUBLICATIONS

Canadian Office Action dated Apr. 29, 2016, by the Canadian Patent Office in counterpart Canadian Patent Application 2,834,409.
T. Wiegand, "Editor's Proposed Modifications to Joint Committee Draft (CD) of Joint Video Specification (ITU-T Rec. H.264 | ISO/IEC 14496-10 AVC) relative to JVT-D015d5",Document: JVT-D017 draft 1, Joint Video Team (JVT) of ISO/IEC MPEG and ITU-T VCEG, 4$^{th}$ Meeting, Jul. 2002.
Chinese Office Action dated Apr. 6, 2016, by the Chinese Patent Office in counterpart Chinese Patent Application 201280025580.9.
Wiegand et al., "Editor's Proposed Modifications to Joint Committee Draft (CD) of Joint Video Specification relative to JVT-D015d5", JVT-D017d1, pp. 1-144, Jul. 2002.
Wiegand et al., "WD3: Working Draft 3 of High-Efficiency Video Coding", JCTVC-E603v6, pp. 1-215, Jun. 13, 2011.
Chien-Chung Kuo et al., "Design of a Low Power Architecture for CABAC Encoder in H.264", Circuits and Systems, APCCAS 2006, IEEE Asia Pacific Conference On, IEEE. XP031070818, pp. 243-246, Dec. 2006.
G. Sullivan et al.; "The H.264/AVC Advanced Video Coding Standard: Overview and Introduction to the Fidelity Range Extensions", Proceedings of Spie, International Society for Optical Engineering, vol. 5558, XP002340590, ISSN: 0277-786X, DOI: 10.1117/12.564457, Section 2.1.5, Entropy Coding, pp. 454-474, Nov. 2004.
D. Marpe et al., "Context-Based Adaptive Binary Arithmetic Coding in the H.264/AVC Video Compression Standard", IEEE Transactions on Circuits and Systems for Video Technology, IEEE Service Center, vol. 13, No. 7, XP011099255, ISSN: 1051-8215, Doi: 10.1109/TCSVT, section II>A. Binarization. subsection 2) Design of CABAC Binerization Schemes, pp. 620-636. Jul. 2003.
Supplementary European Search Report dated Feb. 5, 2015 by the European Patent Office in counterpart European Patent Application 12810767.9.
T. Wiegand et al., "WD3: Working Draft 3 of High-Efficiency Video Coding",Document: JCTVC-E603, Joint Collaborative Team on Video Coding (JCT-VC) of ITU-T SG16 WP3 and ISO/IEC JTC1/SC29/WG11 5$^{th}$ Meeting: Geneva, Mar. 2011.
Korean Office Action dated Jan. 19, 2015 by the Korean Patent Office in counterpart Korean Patent Application 10-2013-7027494.
Keiichi Chono et al., "Efficient binary representation of cu_qp_delta syntax for CABAC", Joint Collaborative Team on Video Coding (JCT-VC) of ITU-T SG16 WP3 and ISO/IEC JTC1/SC29/WG11 6$^{th}$ Meeting: Torino, Jul. 1, 2011, [JCTVC-F046-v1] (version 1) pp. 1-10.
"Information technology—Coding of audio-visual objects", ISO/IEC 14496-10 Advanced Video Coding (2009), pp. 1-12.
Keiichi Chong et al., "On cu_qp_delta range constraint", Joint Collaborative Team on Video Coding (JCT-VC) of ITU-T SG16 WP3 and ISO/IEC JTC1/SC29/WG11 6$^{th}$ Meeting: Torino, Jul. 9, 2011, [JCTVC,-F663-v1] (version 1), pp. 1-4.
Thomas Wiegand et al., "WD3: Working Draft 3 of High-Efficiency Video Coding", Joint Collaborative Team on Video Coding (JCT-VC) of ITU-T SG16 WP3 and ISO/IEC JTC1/SC29/WG11 5$^{th}$ Meeting: Geneva, Mar. 2011, pp. 1-10.
International Search Report and Written Opinion of ISA dated Sep. 11, 2012.
K. Sugimoto et al., "Signaling of Max and Min QP in slice", Joint Collaborative Team on Video Coding (JCT-VC) of ITU-T SG16 WP3 and ISO/IEC JTC1/SC29/WG11, JCTVC-F174, pp. 1-6, Jul. 2011.
Notice of Allowance dated Oct. 14, 2016, by the Korean Patent Office in counterpart Korean Patent Application No. 10-2016-7019402.
Official Decision of Grant dated Mar. 17, 2017, by the Russian Patent Office in counterpart Russian Patent Application No. 2015152459.
Keiichi Chono et al., "Efficient binary representation of cu_qp_delta syntax for CABAC", Joint Collaborative Team on Video Coding (JCT-VC) of ITU-T SG16 WP3 and ISO/IEC JTC1/SC29/WG11 6$^{th}$ Meeting: Torino, Jul. 1, 2011, [JCTVC-F046-v1] (version 1), pp. 1-10.
Keiichi Chono et al., "On cu_qp_delta range constraint", Joint Collaborative Team on Video Coding (JCT-VC) of ITU-T SG16 WP3 and ISO/IEC JTC1/SC29/WG11 6$^{th}$ Meeting: Torino, Jul. 9, 2011, [JCTVC-F663-v1] (version 1), pp. 1-4.
Official Decision of Grant dated Sep. 25, 2017, by the Russian Patent Office in counterpart Russian Patent Application No. 2017124350.
Decision to Grant a Patent for Invention, dated Feb. 27, 2018, issued in counterpart Russian Patent Application No. 2017140827/08(070831).
Decision to Grant dated Jun. 13, 2018, issued by the Russian Patent Office, in counterpart Russian Patent Application No. 2018112904/08(020157).

(56) References Cited

OTHER PUBLICATIONS

Chinese Office Action dated Jul. 6, 2018, by the Chinese Patent Office in counterpart Chinese Patent Application No. 201611084415.7.

* cited by examiner

FIG. 3

| |DQP| | Bin string | | | | | | | | Sign bin |
|---|---|---|---|---|---|---|---|---|---|
| | 1st | 2nd | 3rd | 4th | 5th | 6th | ... | 26th | |
| 0 | 0 | | | | | | | | |
| 1 | 1 | 0 | | | | | | | X |
| 2 | 1 | 1 | 0 | | | | | | X |
| 3 | 1 | 1 | 1 | 0 | | | | | X |
| 4 | 1 | 1 | 1 | 1 | 0 | | | | X |
| 5 | 1 | 1 | 1 | 1 | 1 | 0 | | | X |
| ... | | | | | | | | | |
| 25 | 1 | 1 | 1 | 1 | 1 | 1 | ... | 0 | X |
| 26 | 1 | 1 | 1 | 1 | 1 | 1 | ... | 1 | X |
| Context index | 0 | 2 | 3 | 4 | 5 | 6 | ... | 26 | na |

FIG. 4

```
absV = Abs(synVal)
if(absV = 0){
    put(0)
} else {
    put(1)
    signV = (synVal > 0)? 0:1
    cMax = 25 + QpBdOffset_Y / 2;
    cNum = absV - 1
    absVGreaterThan1Flag = (absV = 1)? 0:1
    put(absVGreaterThan1Flag)
    if(absVGreaterThan1Flag){
        while(-cNum)
        {
            put(1)
        }
        if(cMax > absV - 1){
            put(0)
        }
    }
    put(signV)
}
```

FIG. 9

```
absV = Abs(synVal)
if(absV = 0){
    put(0)
} else {
    put(1)
    signV = (synVal > 0)? 0:1
    cMax = max(QP_{Y,PREV} - MinQP - 1, MaxQP - QP_{Y,PREV} - 1);
    cNum = absV - 1
    if(cMax > 0){
        absVGreaterThan1Flag = (absV = 1)? 0:1
        put(absVGreaterThan1Flag)
        if(absVGreaterThan1Flag){
            while(~cNum)
            {
                put(1)
            }
            if(cMax > absV - 1){
                put(0)
            }
        }
    }
    put(signV)
}
```

| \|DQP\| | Bin string | | | | | | | | Sign bin |
|---|---|---|---|---|---|---|---|---|---|
|  | 1st | 2nd | 3rd | 4th | 5th | 6th | ... | 26th |  |
| 0 | 0 |  |  |  |  |  |  |  |  |
| 1 | 1 | 0 |  |  |  |  |  |  | X |
| 2 | 1 | 1 | 0 |  |  |  |  |  | X |
| 3 | 1 | 1 | 1 | 0 |  |  |  |  | X |
| 4 | 1 | 1 | 1 | 1 | 0 |  |  |  | X |
| 5 | 1 | 1 | 1 | 1 | 1 | 0 |  |  | X |
| ... | | | | | | | | | |
| 25 | 1 | 1 | 1 | 1 | 1 | 1 | ... | 0 | X |
| 26 | 1 | 1 | 1 | 1 | 1 | 1 | ... | 1 | X |
| Context index | 0 | 2 | 3 | 3 | 3 | 3 | ... | 3 | na |

FIG. 15

| Bin string index | Bin string | | | | | | | | | | | | | DQP |
|---|---|---|---|---|---|---|---|---|---|---|---|---|---|---|
| | 1st | 2nd | 3rd | 4th | 5th | 6th | 7th | ... | 49th | 50th | 51st | 52nd | 53rd | |
| 1 | 0 | | | | | | | | | | | | | 0 |
| 2 | 1 | 0 | | | | | | | | | | | | -1 |
| 3 | 1 | 1 | 0 | | | | | | | | | | | 1 |
| 4 | 1 | 1 | 1 | 0 | | | | | | | | | | -2 |
| 5 | 1 | 1 | 1 | 1 | 0 | | | | | | | | | 2 |
| 6 | 1 | 1 | 1 | 1 | 1 | 0 | | | | | | | | -3 |
| ... | | | | | | | ... | | | | | | | |
| 50 | 1 | 1 | 1 | 1 | 1 | 1 | 1 | ... | 1 | 0 | | | | 25 |
| 51 | 1 | 1 | 1 | 1 | 1 | 1 | 1 | ... | 1 | 1 | 0 | | | -25 |
| 52 | 1 | 1 | 1 | 1 | 1 | 1 | 1 | ... | 1 | 1 | 1 | 0 | | 26 |
| 53 | 1 | 1 | 1 | 1 | 1 | 1 | 1 | ... | 1 | 1 | 1 | 1 | 0 | -26 |
| Context index | 0 | 2 | 3 | 3 | 3 | 3 | 3 | ... | 3 | 3 | 3 | 3 | 3 | |

IMAGE QUANTIZATION PARAMETER ENCODING METHOD AND IMAGE QUANTIZATION PARAMETER DECODING METHOD

CROSS-REFERENCE TO RELATED PATENT APPLICATIONS

This application is a continuation of U.S. patent application Ser. No. 15/238,587 filed Aug. 16, 2016, which is a continuation of U.S. patent application Ser. No. 14/112,978 filed Oct. 21, 2013, which is a National Stage Entry of International Application No. PCT/JP2012/003897, filed Jun. 14, 2012, which claims priority from Japanese Patent Application No. 2011-153427, filed Jul. 12, 2011. The entire contents of the above-referenced applications are expressly incorporated herein by reference.

TECHNICAL FIELD

The present invention relates to a technique of encoding an image quantization parameter for image encoding that uses context-based adaptive binary arithmetic coding, and for example relates to an image quantization parameter encoding method, an image quantization parameter decoding method, an image quantization parameter encoder, an image quantization parameter decoder, an image quantization parameter encoding program, and an image quantization parameter decoding program that are suitably applicable to an image encoding device, an image decoding device, and the like.

BACKGROUND ART

Non Patent Literatures (NPLs) 1 and 2 each disclose an image encoding technique that uses context-based adaptive binary arithmetic coding (CABAC).

FIG. 14 is a block diagram showing a structure of an image quantization parameter encoding device in the image encoding technique that uses CABAC. The image quantization parameter encoder shown in FIG. 14 (hereafter referred to as the typical image quantization parameter encoder) includes a predictor 101, a buffer 102, a binarizer 1030, an adaptive binary arithmetic encoder 104, and a switch (SW) 111.

A predicted quantization parameter (predicted QP: PQP) supplied from the predictor 101 is subtracted from a quantization parameter (QP) input to the typical image quantization parameter encoder. The QP from which the PQP has been subtracted is referred to as a delta quantization parameter (delta QP: DQP).

In NPL 1, the PQP is a reconstructed quantization parameter (last reconstructed QP: LastRQP) of a last reconstructed image block. In NPL 2, the PQP is a reconstructed quantization parameter (left reconstructed QP: LeftRQP) of a left adjacent image block or a reconstructed quantization parameter (LastRQP) of a last reconstructed image block.

The PQP is added to the DQP and the sum is stored in the buffer 102 as a reconstructed quantization parameter (reconstructed QP: RQP), for subsequent quantization parameter encoding.

The binarizer 1030 binarizes the DQP to obtain a bin string. One bit of the bin string is referred to as a bin. In the bin string, a bin that is binary arithmetic encoded first is referred to as the first bin ($1^{st}$ bin), a bin that is binary arithmetic encoded second is referred to as the second bin ($2^{nd}$ bin), and a bin that is binary arithmetic encoded nth is referred to as the nth bin ($n^{th}$ bin). The bin and the bin string are defined in 3.9 and 3.12 in NPL 1.

FIG. 15 is an explanatory diagram showing a correspondence table between the DQP (rightmost column) and the bin string (center column) in NPLs 1 and 2.

A bin string index in the leftmost column in FIG. 15 indicates an index of a bin string corresponding to a DQP value. The bin string index is 1 in the case where the DQP is 0, 2*DQP−1 in the case where the DQP is greater than 0, and −2*DQP+1 in the case where the DQP is less than 0 (where "*" denotes multiplication).

A context index in the lowermost row in FIG. 15 indicates an index of a context used for binary arithmetic encoding of a bin in a corresponding column. For example, the bin string corresponding to DQP=−1 is 110 in which the value of the first bin is 1, the value of the second bin is 1, and the value of the third bin is 0. The context index used for binary arithmetic encoding of the first bin is 0, the context index used for binary arithmetic encoding of the second bin is 2, and the context index used for binary arithmetic encoding of the third bin is 3. The context mentioned here is a combination of a most probable symbol (PS) of the bin and its probability.

The adaptive binary arithmetic encoder 104 binary arithmetic encodes each bin of the bin string supplied via the switch 111 beginning with the first bin, using the context associated with the corresponding context index. The adaptive binary arithmetic encoder 104 also updates the context associated with the context index according to the value of the binary arithmetic encoded bin, for subsequent binary arithmetic encoding. Detailed operations of adaptive binary arithmetic encoding are described in 9.3.4 in NPL 1.

The typical quantization parameter encoder encodes the input image quantization parameter based on the above-mentioned operations.

CITATION LIST

Non Patent Literature(s)

NPL 1: ISO/IEC 14496-10 Advanced Video Coding
NPL 2: "WD3: Working Draft 3 of High-Efficiency Video Coding", Document: JCTVC-E603, Joint Collaborative Team on Video Coding (JCT-VC) of ITU-T SG16 WP3 and ISO/IEC JTC1/SC29/WG11 5th Meeting: Geneva, CH, 16-23 Mar. 2011

SUMMARY OF INVENTION

Technical Problem

As can be seen from FIG. 15, the typical quantization parameter encoder performs binarization without distinguishing between information about whether the significant DQP is positive or negative and information about the absolute value of the significant DQP. The typical quantization parameter encoder therefore has a problem of being unable to suitably encode the significant DQP due to the following three factors.

The first factor is that, since the second bin (bin in the column "$2^{nd}$") and the subsequent bins (bins in the columns from "$3^{rd}$" onward) include information about three or more states which cannot be expressed by one bin, it is impossible to binary arithmetic encode the bins using appropriate contexts. Information that can be expressed by one bin is information of which one of two states holds true. However, the second bin and the subsequent bins include information about three or more states which cannot be expressed by one bin. In detail, in FIG. 15, the second bin includes information of whether the DQP is positive or negative and information indicating whether or not the absolute value of the significant DQP is greater than or equal to 1. The subsequent bins from the third bin (in the columns from "$3^{rd}$" onward) include information of whether the DQP is positive or negative and information indicating the magnitude of the absolute value of the significant DQP. Hence, it is impossible to binary arithmetic encode, with appropriate contexts, the second bin and the subsequent bins including information about three or more states which cannot be expressed by one bin.

The second factor is that redundant bins cannot be efficiently reduced even in the case where the DQP range is known. For example, the DQP range defined in NPLs 1 and 2 is from −26 to 25, which is asymmetric between positive and negative. In FIG. 15, DQP=−26 needs to be encoded without reducing the redundant 52nd and 53rd bins, due to the presence of the bin string of DQP=26 that is not transmitted.

The third factor is that the number of bins included in the bin string handled by the typical quantization parameter encoder is approximately twice the number of bins in the case of separately binarizing the information of whether the significant DQP is positive or negative and the absolute value of the significant DQP, A large number of bins leads to an increase in the amount of encoded data and a decrease in the speed of the DQP encoding process and decoding process.

The present invention has an object of enabling suitable encoding of an image quantization parameter for image encoding that uses context-based adaptive binary arithmetic coding, by resolving each of the above-mentioned factors.

Solution to Problem

An image quantization parameter encoding method according to the present invention is an image quantization parameter encoding method for encoding a quantization parameter for a video encoding process that is based on context-based adaptive binary arithmetic coding, the image quantization parameter encoding method including: generating a predicted quantization parameter from a past reconstructed quantization parameter; generating a delta quantization parameter from a quantization parameter and the predicted quantization parameter; binary arithmetic encoding a first bin indicating whether or not the delta quantization parameter is significant, other bins indicating an absolute value of the delta quantization parameter, and a bin indicating whether the delta quantization parameter is positive or negative, in the case where the delta quantization parameter is significant; and reducing one or more of the other bins using a range of the delta quantization parameter.

An image quantization parameter decoding method according to the present invention is an image quantization parameter decoding method for decoding a quantization parameter for a video decoding process that is based on context-based adaptive binary arithmetic coding, the image quantization parameter decoding method including: generating a predicted quantization parameter from a past reconstructed quantization parameter; binary arithmetic decoding a first bin indicating whether or not a delta quantization parameter is significant, other bins indicating an absolute value of the delta quantization parameter, and a bin indicating whether the delta quantization parameter is positive or negative; and estimating one or more of the other bins reduced in a video encoding process, using a range of the delta quantization parameter.

An image quantization parameter encoder according to the present invention is an image quantization parameter encoder for encoding a quantization parameter for a video encoding process that is based on context-based adaptive binary arithmetic coding, the image quantization parameter encoder including: prediction means for generating a predicted quantization parameter from a past reconstructed quantization parameter; computing means for generating a delta quantization parameter from a quantization parameter and the predicted quantization parameter; quantization parameter encoding means for binary arithmetic encoding a first bin indicating whether or not the delta quantization parameter is significant, other bins indicating an absolute value of the delta quantization parameter, and a bin indicating whether the delta quantization parameter is positive or negative, in the case where the delta quantization parameter is significant; and redundancy suppression means for reducing one or more of the other bins using a range of the delta quantization parameter.

An image quantization parameter decoder according to the present invention is an image quantization parameter decoder for decoding a quantization parameter for a video decoding process that is based on context-based adaptive binary arithmetic coding, the image quantization parameter decoder including: prediction means for generating a predicted quantization parameter from a past reconstructed quantization parameter; quantization parameter decoding means for binary arithmetic decoding a first bin indicating whether or not a delta quantization parameter is significant, other bins indicating an absolute value of the delta quantization parameter, and a bin indicating whether the delta quantization parameter is positive or negative; and estimation means for estimating one or more of the other bins reduced in a video encoding process, using a range of the delta quantization parameter.

An image quantization parameter encoding program according to the present invention causes a computer in an image quantization parameter encoder for encoding a quantization parameter for a video encoding process that is based on context-based adaptive binary arithmetic coding, to execute: a process of generating a predicted quantization parameter from a past reconstructed quantization parameter; a process of generating a delta quantization parameter from a quantization parameter and the predicted quantization parameter; a process of binary arithmetic encoding a first bin indicating whether or not the delta quantization parameter is significant, other bins indicating an absolute value of the delta quantization parameter, and a bin indicating whether the delta quantization parameter is positive or negative, in the case where the delta quantization parameter is significant; and a process of reducing one or more of the other bins using a range of the delta quantization parameter.

An image quantization parameter decoding program according to the present invention causes a computer in an image quantization parameter decoder for decoding a quantization parameter for a video decoding process that is based on context-based adaptive binary arithmetic coding, to execute: a process of generating a predicted quantization parameter from a past reconstructed quantization parameter; a process of binary arithmetic decoding a first bin indicating whether or not a delta quantization parameter is significant, other bins indicating an absolute value of the delta quantization parameter, and a bin indicating whether the delta quantization parameter is positive or negative; and a process of estimating one or more of the other bins reduced in a video encoding process, using a range of the delta quantization parameter.

Advantageous Effect of Invention

According to the present invention, it is possible to suitably encode an image quantization parameter for image encoding that uses context-based adaptive binary arithmetic coding.

BRIEF DESCRIPTION OF DRAWINGS

FIG. 3 is an explanatory diagram showing an example of a correspondence table between a DQP and a bin string.

FIG. 4 is an explanatory diagram showing a pseudo program for converting the DQP to the bin string.

FIG. 9 is an explanatory diagram showing a pseudo program for converting the DQP to the bin string.

FIG. 15 is an explanatory diagram showing a typical example of a correspondence table between a DQP and a bin string.

DESCRIPTION OF EMBODIMENTS

The following describes exemplary embodiments of the present invention with reference to drawings.

Exemplary Embodiment 1

Figure 1:
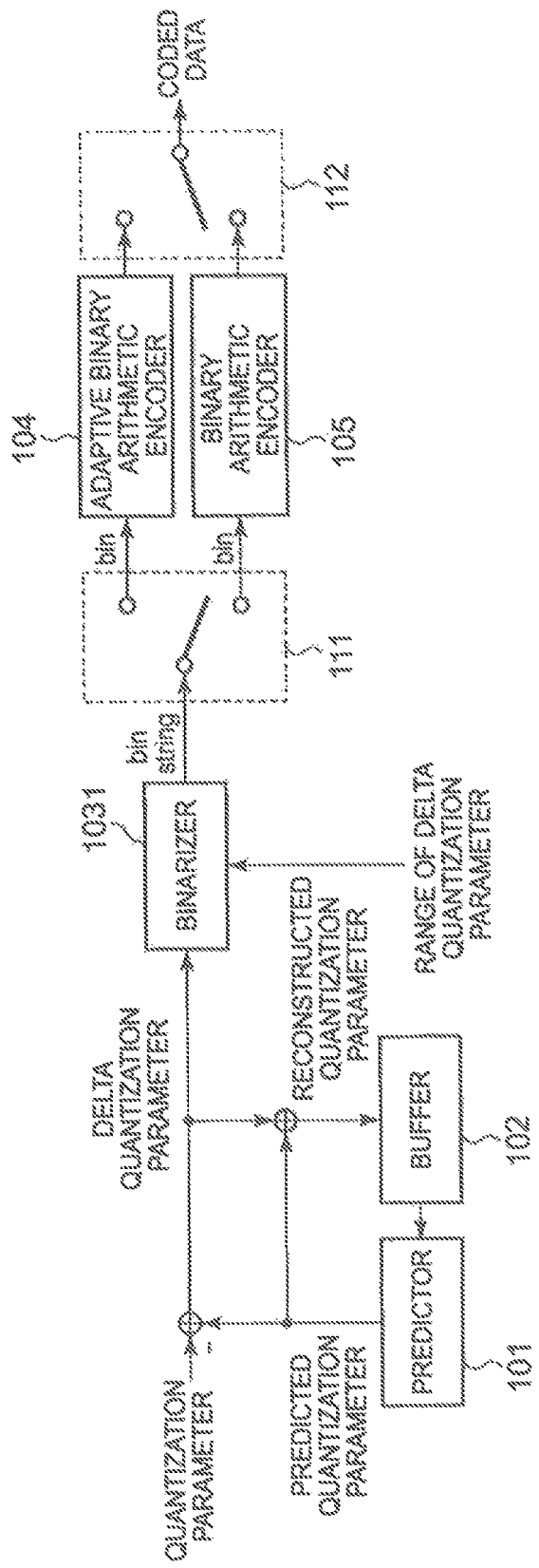
FIG. 1 is a block diagram showing a structure of an image quantization parameter encoder in Exemplary Embodiment 1.

FIG. 1 is a block diagram showing a structure of an image quantization parameter encoder in Exemplary Embodiment 1 of the present invention. The image quantization parameter encoder shown in FIG. 1 includes a predictor 101, a buffer 102, a binarizer 1031, an adaptive binary arithmetic encoder 104, a binary arithmetic encoder 105, a switch (SW) 111, and a switch (SW) 112.

A predicted quantization parameter PQP supplied from the predictor 101 is subtracted from a quantization parameter QP input to the image quantization parameter encoder.

The PQP is added to a delta quantization parameter DQP (DQP=QP−PQP) and the sum is stored in the buffer 102 as a reconstructed quantization parameter RQP (RQP=DQP+PQP), for subsequent quantization parameter encoding.

The binarizer 1031 which is a feature of the present invention binarizes the DQP using a combination of a minimum DQP (minDQP≤0) and a maximum DQP (maxDQP≥0). In detail, the binarizer 1031 first computes the first bin of the DQP and a maximum number cMax (i.e. a value obtained by subtracting 1, which corresponds to the first bin, from a larger one of the absolute values of minDQP and maxDQP) of the subsequent bins that relate to the absolute value of the DQP, by the following equations.

$$\mathrm{bin}(1) = \mathrm{func1}(DQP) \qquad (1)$$

$$c\mathrm{Max} = \max(|\mathrm{minDQP}|, |\mathrm{maxDQP}|) - 1 \qquad (2).$$

When cMax≥1, the binarizer 1031 computes bin(n) (n=2, . . . , min(1+|DQP|, 1+cMax)) by the following equation.

$$\mathrm{bin}(n) = \mathrm{func2}(n-2, c\mathrm{Max}, |DQP|-1) \qquad (3).$$

Here, func2(a, b, c) is a function that returns 1 if b and c are equal, returns 1 if c is less than b and a is less than c, and returns 0 otherwise (if c is less than b and a and c are equal). The bins (with syntax element value |DQP|) of the bin string that relate to the absolute value of the DQP and are obtained by equation (3) are the same as the bins of the bin string obtained by the truncated unary (TU) binarization process described in 9.3.2.2 in NPL 1.

As is clear from equation (3), the bins of the bin string that relate to the absolute value of the DQP and are obtained by equation (3) are the bins of the bin string made non-redundant based on the DQP range (maximum value of the absolute values of the minimum DQP and the maximum DQP).

The binarizer 1031 binarizes information indicating whether the significant DQP is positive or negative by associating it with a sign bin (Signbin), by the following equation.

$$\mathrm{Signbin} = \mathrm{func3}(DQP) \qquad (4).$$

Here, func3(a, b) is a function that returns 1 if a is less than b and returns 0 otherwise, and func3(a) is a function that returns 0 if a is positive and returns 1 if a is not positive. As is clear from equations (2), (3), and (4), bin(n) (n=2, 3, . . . ) is encoded only in the case where the DQP has a significant value (note that the Signbin is the last bin).

The adaptive binary arithmetic encoder 104 binary arithmetic encodes each bin (bin(n): n=1, 2, . . . , min(1+|DQP|, 1+cMax)), other than the Signbin, of the bin string supplied via the switch 111 using the context associated with the context index corresponding to the bin, and outputs the encoded data via the switch 112. The adaptive binary arithmetic encoder 104 also updates the context associated with the context index according to the value of the binary arithmetic encoded bin, for subsequent binary arithmetic encoding.

The binary arithmetic encoder 105 binary arithmetic encodes, with equal probability, the Signbin of the bin string supplied via the switch 111, and outputs the encoded data via the switch 112.

This completes the description of the structure of the image quantization parameter encoder in this exemplary embodiment.

Figure 2:
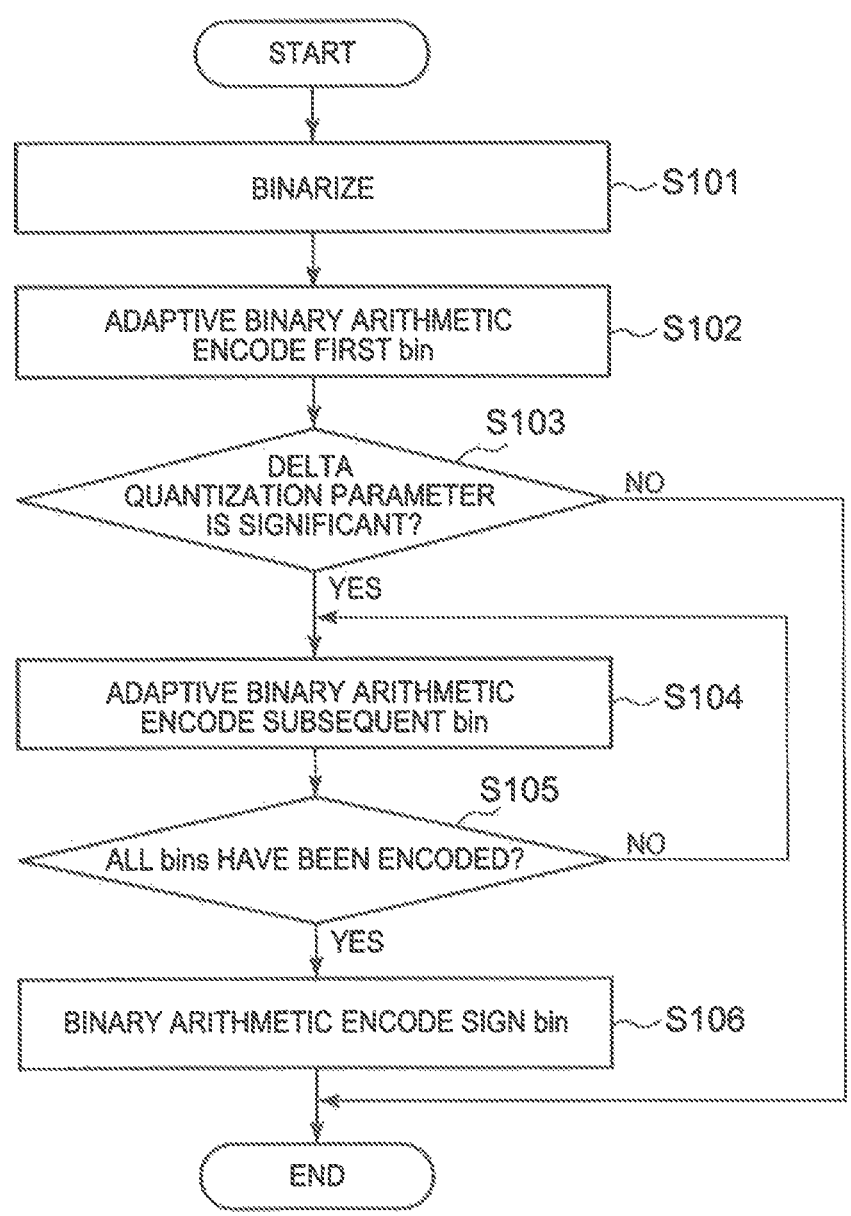
FIG. 2 is a flowchart showing operations of the image quantization parameter encoder in Exemplary Embodiment 1.

The following describes operations of the binarizer 1031, the adaptive binary arithmetic encoder 104, and the binary arithmetic encoder 105 which are features of the image quantization parameter encoder in this exemplary embodiment, using a flowchart in FIG. 2.

The process starts, with the adaptive binary arithmetic encoder 104 setting an initial value parameter n to 2.

In step S101, the binarizer 1031 binarizes the DQP in a manner that the information indicating whether or not the DQP is significant is associated with the first bin, the information indicating the absolute value of the DQP is associated with the second and subsequent bins, and the information indicating whether or not the significant DQP is positive is associated with the Signbin.

In step S102, the adaptive binary arithmetic encoder 104 adaptive binary arithmetic encodes bin(1).

In step S103, the binary arithmetic encoder 105 determines whether or not the DQP is significant. In the case where the DQP is significant, the process proceeds to step S104. Otherwise, the process ends.

In step S104, the adaptive binary arithmetic encoder 104 adaptive binary arithmetic encodes bin(n).

In step S105, the adaptive binary arithmetic encoder 104 determines whether or not all bins of the bin string have been encoded. In the case where all bins have been encoded, the process proceeds to step S106. Otherwise, the adaptive binary arithmetic encoder 104 increments n and the process proceeds to step S104, to adaptive binary arithmetic encode the subsequent bin(n).

In step S106, the binary arithmetic encoder 105 binary arithmetic encodes the Signbin. The process then ends.

This completes the description of the operations of the binarizer 1031, the adaptive binary arithmetic encoder 104, and the binary arithmetic encoder 105 which are features of the image quantization parameter encoder in this exemplary embodiment.

FIG. 3 is an explanatory diagram showing an example of a correspondence table between |DQP| (leftmost column) and the bin string (center column) according to the present invention.

In FIG. 3, X in the Signbin column of the bin string represents 1-bit information indicating whether or not the DQP is positive, i.e. whether the DQP is positive or negative. Suppose X=0 denotes positive and X=1 denotes negative. Then, for example, the bin string of DQP=1 is 100, and the bin string of DQP=−1 is 101. Moreover, na in the context index row denotes that no context is used (i.e. the most probable symbol and its probability are fixed).

FIG. 4 is an explanatory diagram showing a pseudo program for generating a bin string corresponding to a DQP of a value synVal, where minDQP=−(26+QpBdOffset$_Y$/2) and maxDQP=(25+QpBdOffset$_Y$/2). According to equation (2), cMax=max(|26+QpBdOffset$_Y$/2|, |25+QpBdOffset$_Y$/2|)−1=26+QpBdOffset$_Y$/2−1=25+QpBdOffset$_Y$/2. Note that the definitions of the arithmetic operations used in the pseudo program are in accordance with the definitions in "5 Conventions" in NPL 2.

The binarization process according to the present invention resolves the three factors causing the problem mentioned above, as follows.

The first factor is resolved by binary arithmetic encoding the second bin and the subsequent bins using appropriate contexts. In FIG. 3, the second bin indicates only the information of whether or not the absolute value of the DQP is greater than 1, that is, information of which one of two states holds true. The third and subsequent bins indicate only the information of whether or not the absolute value of the DQP is greater than a given value, that is, information of which one of two states holds true, as with the second bin. The Signbin indicates only the information of whether the DQP is positive or negative, that is, information of which one of two states holds true. Therefore, the second bin and the Signbin are binary arithmetic encoded using appropriate contexts.

The second factor is resolved because the encoder can efficiently reduce redundant bins using the DQP range. In detail, in FIG. 3, in the case of encoding DQP=−26, the redundant 27th bin does not need to be encoded because the decoder is able to identify DQP=−26 when the 26th bin is 1 on the ground that the minimum value of the DQP is −26.

The third factor is resolved because the number of bins included in the bin string in this exemplary embodiment is the same as the number of bins in the case of separately binarizing the information of whether the significant DQP is positive or negative and the absolute value of the significant DQP, as is clear from the comparison between the correspondence table shown in FIG. 15 and the correspondence table shown in FIG. 3.

Exemplary Embodiment 2

Figure 5:
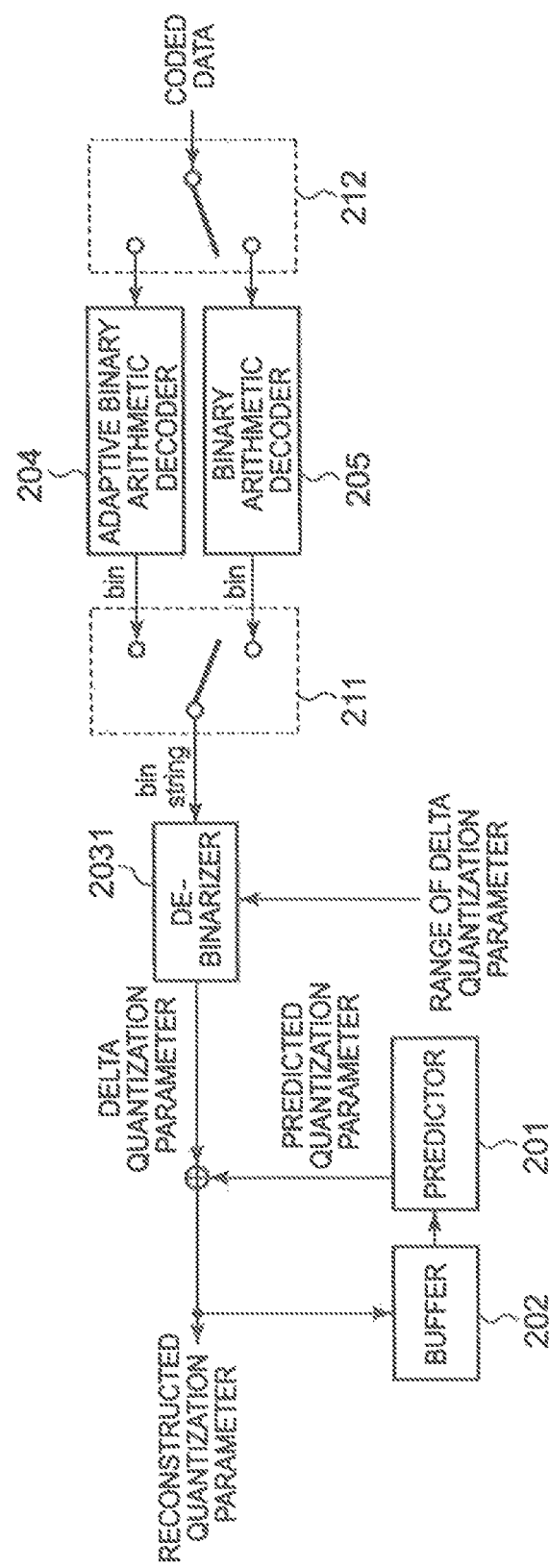
FIG. 5 is a block diagram showing a structure of an image quantization parameter decoder in Exemplary Embodiment 2.

FIG. 5 is a block diagram showing a structure of an image quantization parameter decoder corresponding to the image quantization parameter encoder in Exemplary Embodiment 1. The image quantization parameter decoder shown in FIG. 5 includes a predictor 201, a buffer 202, a de-binarizer 2031, an adaptive binary arithmetic decoder 204, a binary arithmetic decoder 205, a switch (SW) 211, and a switch (SW) 212.

The de-binarizer 2031 computes cMax based on minDQP and maxDQP, by the following equation.

$$cMax = \max(|minDQP|, |maxDQP|) - 1 \qquad (5).$$

The adaptive binary arithmetic decoder 204 binary arithmetic decodes bin(1) from the encoded data supplied via the switch 212, and supplies the decoded data to the de-binarizer 2031 via the switch 211. The adaptive binary arithmetic decoder 204 also updates the context associated with the context index corresponding to the first bin according to the value of the binary arithmetic decoded bin, for subsequent binary arithmetic decoding.

In the case where bin(1) is 1, the adaptive binary arithmetic decoder 204 binary arithmetic decodes bin(n) (n=2, 3, . . . , k, where k≤1 cMax) from the encoded data supplied via the switch 212, until a bin whose value is 0 is decoded, until cMax bins are decoded, or until a bin whose value is 0 is decoded and also cMax bins are decoded. The adaptive binary arithmetic decoder 204 supplies the decoded data to the de-binarizer 2031 via the switch 211. The adaptive binary arithmetic decoder 204 updates the context associated with the context index corresponding to the nth bin according to the value of the binary arithmetic decoded bin, for subsequent binary arithmetic decoding.

Furthermore, in the case where bin(1) is 1, the binary arithmetic decoder 205 binary arithmetic decodes the Signbin from the encoded data supplied via the switch 212, and supplies the decoded data to the de-binarizer 2031 via the switch 211.

The de-binarizer 2031 outputs the DQP whose value is 0, in the case where the bin string is 0 (n=1). In the case where n=1+cMax, the de-binarizer 2031 outputs the DQP whose value is obtained by the following equation.

$$DQP=(1-2*Signbin)*(1+cMax) \qquad (6).$$

"*" in equation (6) denotes multiplication. Otherwise, the de-binarizer 2031 outputs the DQP whose value is obtained by the following equation.

$$DQP=(1-2*Signbin)*(n-1) \qquad (7).$$

As is clear from equation (6), the de-binarizer 2031 can estimate any redundant bin reduced in the video encoding process, using the DQP range (maximum value of the absolute values of the minimum DQP and the maximum DQP). That is, the de-binarizer 2031 can de-binarize the bins of the bin string made non-redundant, using the DQP range (maximum value of the absolute values of the minimum DQP and the maximum DQP).

The PQP supplied from the predictor 201 is added to the DQP supplied from the de-binarizer 2031, to obtain the RQP.

The RQP is stored in the buffer 202 for subsequent quantization parameter decoding.

This completes the description of the structure of the image quantization parameter decoder in this exemplary embodiment.

Figure 6:
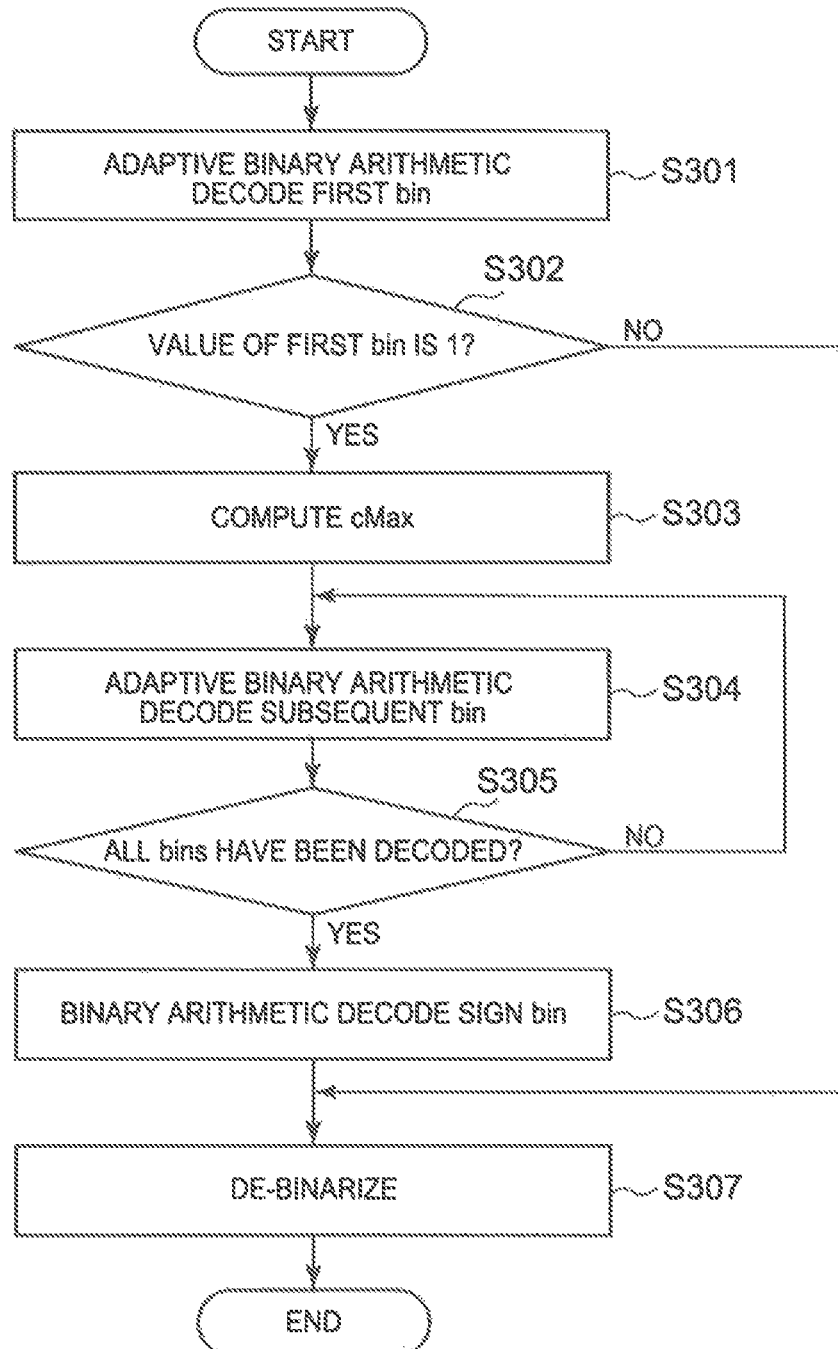
FIG. 6 is a flowchart showing operations of the image quantization parameter decoder in Exemplary Embodiment 2.

The following describes operations of the de-binarizer 2031, the adaptive binary arithmetic decoder 204, and the binary arithmetic decoder 205 which are features of the image quantization parameter decoder in this exemplary embodiment, using a flowchart in FIG. 6.

The process starts, with the adaptive binary arithmetic decoder 204 setting an initial value parameter n to 2.

In step S301, the adaptive binary arithmetic decoder 204 adaptive binary arithmetic decodes bin(1).

In step S302, the binary arithmetic decoder 205 determines whether or not the value of bin(1) is 1. In the case where the value of bin(1) is 1, the process proceeds to step S303. Otherwise, the process proceeds to step S307.

In step S303, the de-binarizer 2031 computes cMax based on minDQP and maxDQP.

In step S304, the adaptive binary arithmetic decoder 204 adaptive binary arithmetic decodes bin(n).

In step S305, the adaptive binary arithmetic decoder 204 determines whether or not all bins relating to |DQP| have been decoded. All bins have been decoded if a condition that the value of bin(n) is 0, a condition that the value of n is equal to cMax, or both of these conditions are met. In the case where all bins relating to |DQP| have been decoded, the process proceeds to step S306. Otherwise, the adaptive binary arithmetic decoder 204 increments n and the process proceeds to step S304, to adaptive binary arithmetic decode the subsequent bin(n).

In step S306, the binary arithmetic decoder 205 binary arithmetic decodes the Signbin.

In step S307, the de-binarizer 2031 de-binarizes the decoded bin string to determine the DQP.

This completes the description of the operations of the de-binarizer 2031, the adaptive binary arithmetic decoder 204, and the binary arithmetic decoder 205 which are features of the image quantization parameter decoder in this exemplary embodiment.

Exemplary Embodiment 3

In the image quantization parameter encoder in FIG. 1 and the image quantization parameter decoder in FIG. 5 described above, minDQP and maxDQP may be generated from the range of the quantization parameter (combination of a minimum QP and a maximum QP) and the predicted quantization parameter PQP.

Figure 7:
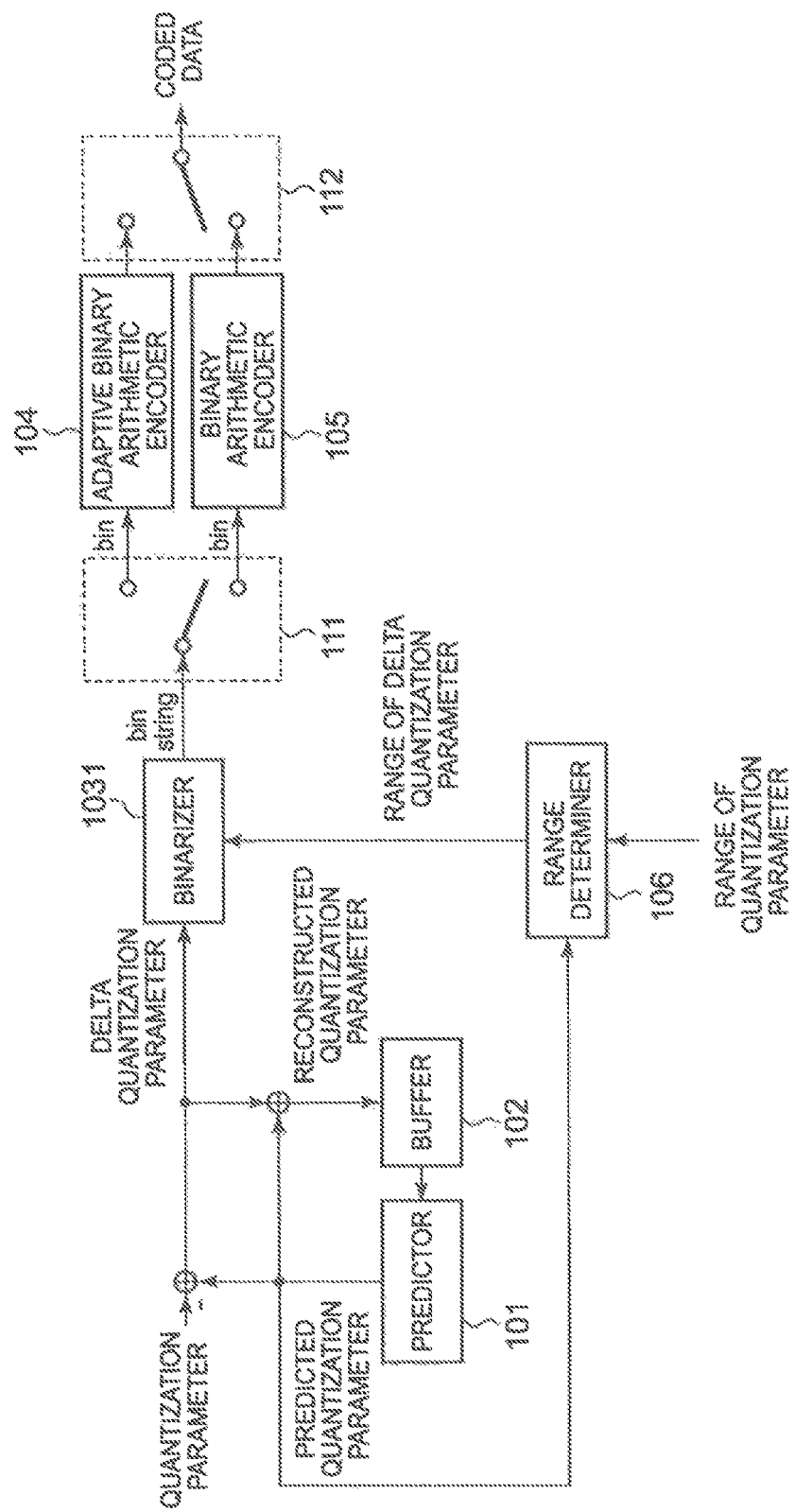
FIG. 7 is a block diagram showing a structure of an image quantization parameter encoder in Exemplary Embodiment 3.
Figure 8:
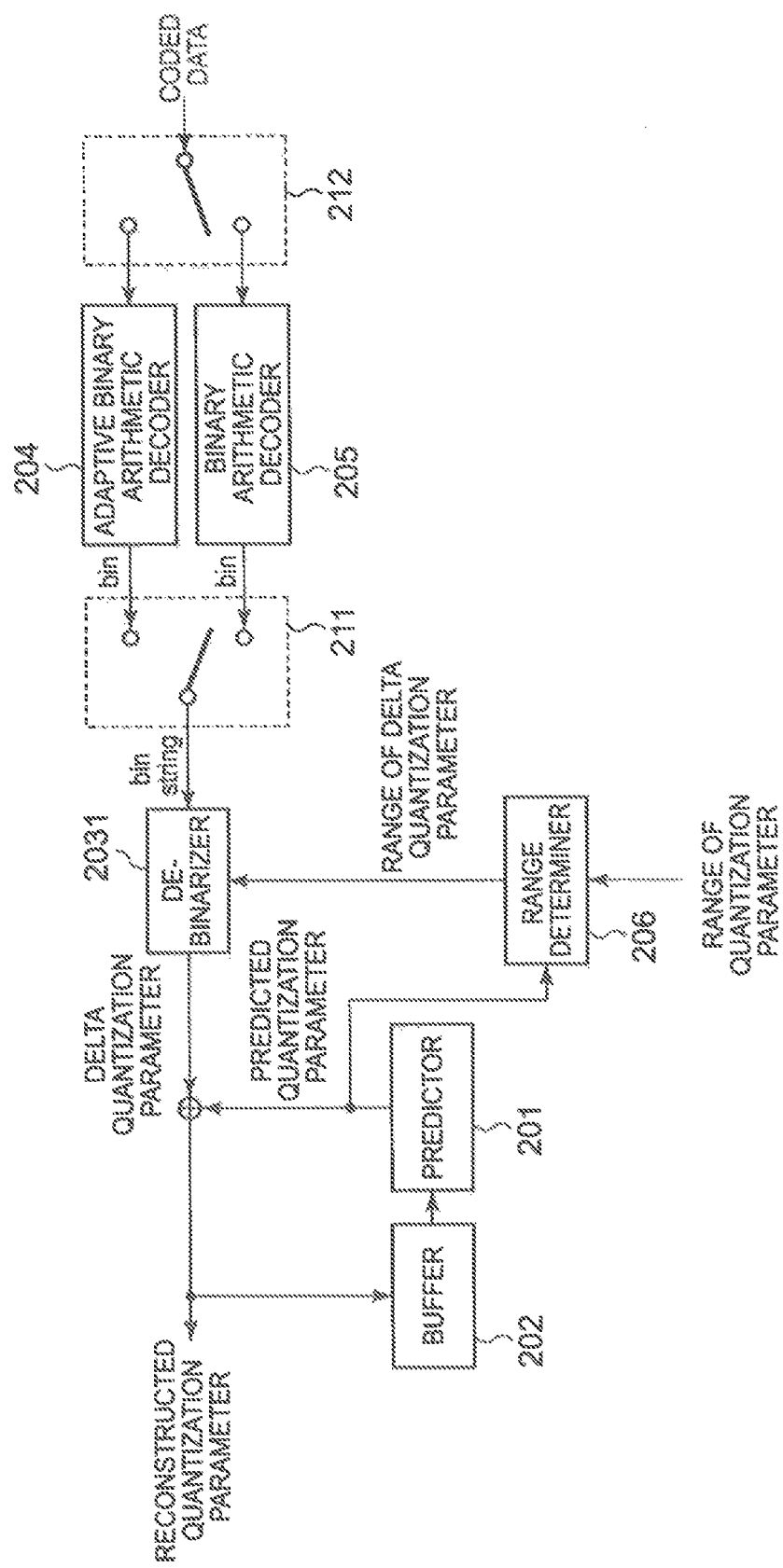
FIG. 8 is a block diagram showing a structure of an image quantization parameter decoder in Exemplary Embodiment 3.

FIGS. 7 and 8 are block diagrams showing structures of an image quantization parameter encoder and an image quantization parameter decoder as an improvement to generate minDQP and maxDQP based on the combination of the minimum QP (minQP) and the maximum QP (maxQP) and the PQP.

The image quantization parameter encoder shown in FIG. 7 further includes a range determiner 106, and the image quantization parameter decoder shown in FIG. 8 further includes a range determiner 206, as can be seen from the comparison with FIGS. 1 and 5. The range determiners 106 and 206 each compute minDQP and maxDQP by the following equations.

$$minDQP=minQP-PQP \qquad (8)$$

$$maxDQP=maxQP-PQP \qquad (9).$$

The inclusion of the range determiners 106 and 206 enables more effective reduction of redundant bins when the QP to be encoded is closer in value to minQP or maxQP.

FIG. 9 is an explanatory diagram showing a pseudo program for generating a bin string corresponding to a DQP of a value synVal (note that the PQP is written as $QP_{Y,PREV}$ in the pseudo program).

In an image quantization parameter encoder and an image quantization parameter decoder where minDQP=−26 and maxDQP=25, equations (8) and (9) may be replaced with the following equations (8)' and (9)'.

$$minDQP=max(-26,minQP-PQP) \qquad (8)'$$

$$maxDQP=min(25,maxQP-PQP) \qquad (9)'.$$

Figures 10, 11:
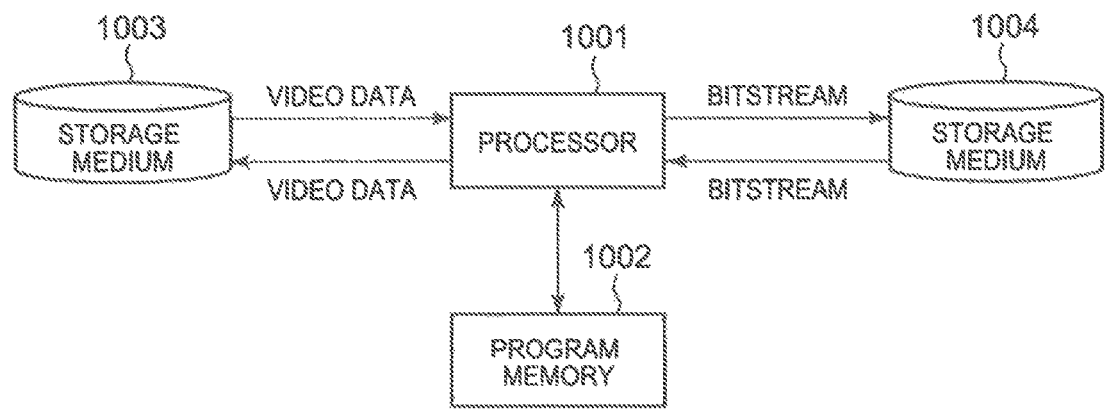
FIG. 10 is an explanatory diagram showing another example of the correspondence table between the DQP and the bin string.
FIG. 11 is a block diagram showing an example of a structure of an information processing system capable of realizing functions of an image quantization parameter encoder and an image quantization parameter decoder according to the present invention.

The image quantization parameter encoder and the image quantization parameter decoder according to the present invention described above may operate based on a correspondence table in which the value of the context index is fixed for bins from a predetermined column onward as shown in FIG. 10, instead of using the example shown in FIG. 3.

In the correspondence table shown in FIG. 10, the value of the context index is fixed at 3 for the bins in the third and subsequent columns. In FIG. 10, the first bin indicates only the information of whether or not the DQP is significant, that is, information of which one of two states holds true. The second bin indicates only the information of whether or not the absolute value of the DQP is greater than 1, that is, information of which one of two states holds true. The third and subsequent bins indicate only the information of whether or not the bin string terminates, that is, information of which one of two states holds true.

Thus, the image quantization parameter encoder according to the present invention may binary arithmetic encode the first bin indicating whether or not the DQP is significant, the third bin indicating whether or not the absolute value of the DQP is greater than 1, the bin indicating whether or not the bin string terminates, and the Signbin indicating the positive or negative sign of the DQP.

As described above, according to the present invention, an image quantization parameter for image encoding that uses con text-based adaptive binary arithmetic coding can be suitably encoded by providing, in a binarization process in which the information indicating whether or not the delta quantization parameter is significant is associated with the first bin, the information indicating the absolute value of the significant delta quantization parameter is associated with the second and subsequent bins, and the information indicating whether the significant delta quantization parameter is positive or negative is associated with the sign bin, means for reducing other redundant bins using the range of the delta quantization parameter defined in standards or the like.

According to the present invention, the above-mentioned suitable encoding is achieved by three features: assigning an appropriate context to each bin of the delta quantization parameter; reducing redundant bins of the delta quantization parameter; and reducing the number of bins included in the bin string of the delta quantization parameter.

Each of the exemplary embodiments described above may be realized not only by hardware but also by a computer program.

An information processing system shown in FIG. 11 includes a processor 1001, a program memory 1002, a storage medium 1003 for storing image data, and a storage medium 1004 for storing a bitstream. The storage medium 1003 and the storage medium 1004 may be separate storage media, or storage areas included in the same storage medium. As a storage medium, a magnetic storage medium such as a hard disk is available.

In the information processing system shown in FIG. 11, a program for realizing the functions of the blocks (except the block of the buffer) shown in any of FIGS. 1, 5, 7, and 8 is stored in the program memory 1002. The processor 1001 realizes the functions of the image quantization parameter encoder or the image quantization parameter decoder shown in any of FIGS. 1, 5, 7, and 8, by executing processes according to the program stored in the program memory 1002.

Figure 12:
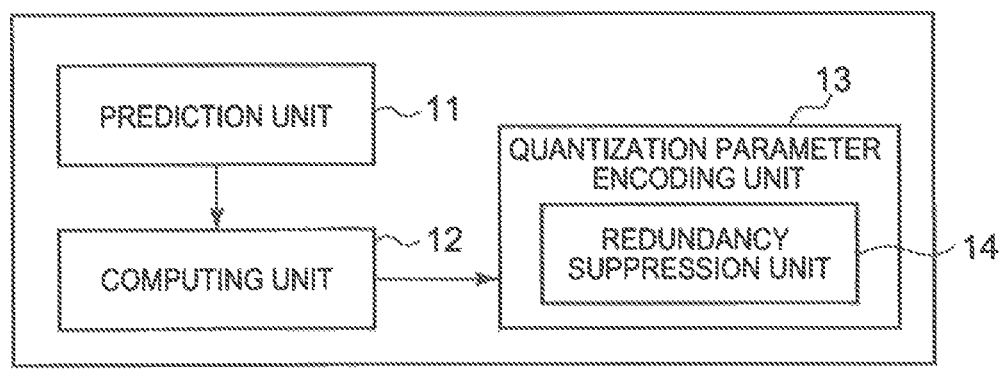
FIG. 12 is a block diagram showing characteristic components in an image quantization parameter encoder according to the present invention.

FIG. 12 is a block diagram showing characteristic components in an image quantization parameter encoder according to the present invention. As shown in FIG. 12, the image quantization parameter encoder according to the present invention includes: a prediction unit 11 for generating a predicted quantization parameter from a past reconstructed quantization parameter; a computing unit 12 for generating a delta quantization parameter from a quantization parameter and the predicted quantization parameter; a quantization parameter encoding unit 13 for binary arithmetic encoding a first bin indicating whether or not the delta quantization parameter is significant, other bins indicating an absolute value of the delta quantization parameter, and a bin indicating whether the delta quantization parameter is positive or negative, in the case where the delta quantization parameter is significant; and a redundancy suppression unit 14 for reducing one or more of the other bins using a range of the delta quantization parameter.

Figure 13:
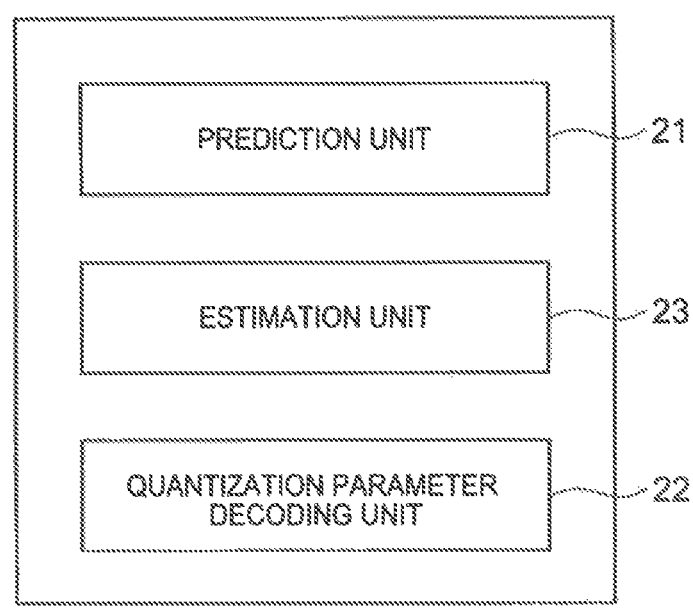
FIG. 13 is a block diagram showing characteristic components in an image quantization parameter decoder according to the present invention.
Figure 14:
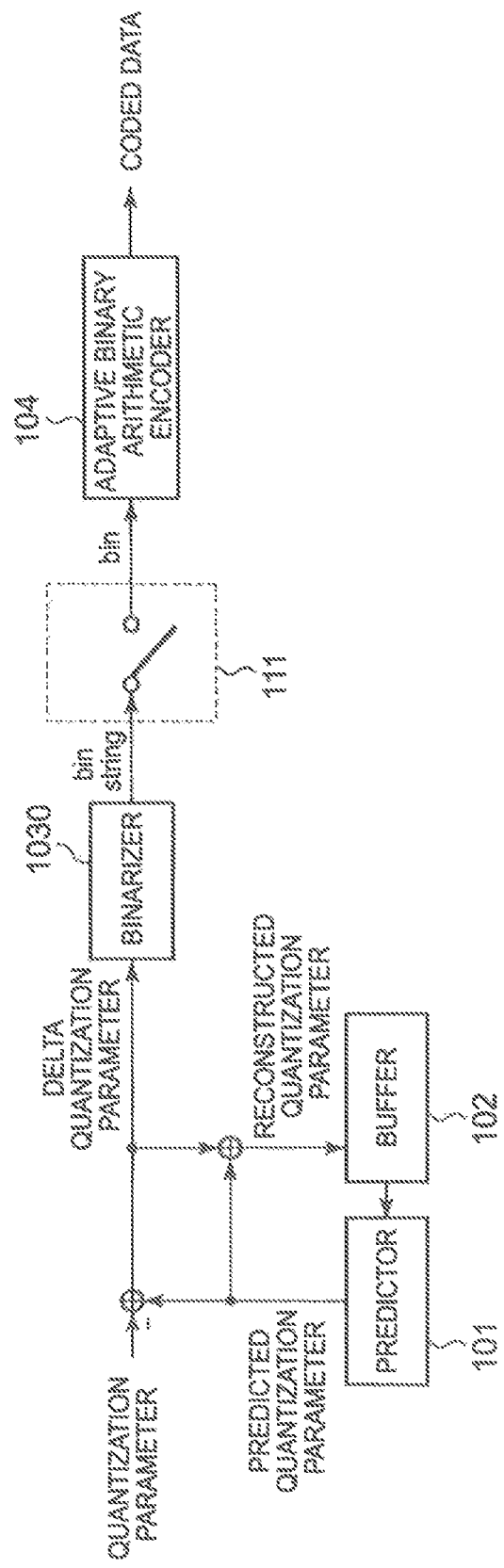
FIG. 14 is a block diagram showing a structure of a typical image quantization parameter encoder.

FIG. 13 is a block diagram showing characteristic components in an image quantization parameter decoder according to the present invention. As shown in FIG. 13, the image quantization parameter decoder according to the present invention includes: a prediction unit 21 for generating a predicted quantization parameter from a past reconstructed quantization parameter; a quantization parameter decoding unit 22 for binary arithmetic decoding a first bin indicating whether or not a delta quantization parameter is significant, other bins indicating an absolute value of the delta quantization parameter, and a bin indicating whether the delta quantization parameter is positive or negative; and an estimation unit 23 for estimating one or more of the other bins reduced in a video encoding process, using a range of the delta quantization parameter.

Though the present invention has been described with reference to the above exemplary embodiments and examples, the present invention is not limited to the above exemplary embodiments and examples. Various changes understandable by those skilled in the art can be made to the structures and details of the present invention within the scope of the present invention.

This application claims priority based on Japanese Patent Application No. 2011-153427 filed on Jul. 12, 2011, the disclosure of which is incorporated herein in its entirety.

REFERENCE SIGNS LIST 11 prediction unit
12 computing unit
13 quantization parameter encoding unit
14 redundancy suppression unit
21 prediction unit
22 quantization parameter decoding unit
23 estimation unit
101 predictor
102 buffer
1031, 1032 binarizer
104 adaptive binary arithmetic encoder
105 binary arithmetic encoder
106 range determiner
111 switch
112 switch
201 predictor
202 buffer
2031, 2032 de-binarizer
204 adaptive binary arithmetic decoder
205 binary arithmetic decoder
206 range determiner
211 switch
212 switch

The invention claimed is:

1. An image quantization parameter decoding method for decoding a quantization parameter for a video decoding process that is based on context-based adaptive binary arithmetic coding, the image quantization parameter decoding method comprising:

binary-arithmetic-decoding a first bin indicating whether or not a delta quantization parameter is significant, other bins, which are subsequent to the first bin, indicating an absolute value of the delta quantization parameter, and a sign bin, which is subsequent to the other bins, indicating whether the delta quantization parameter is positive or negative;

generating a delta quantization parameter by de-binarizing the first bin, the other bins and the sign bin; and generating a re-constructed quantization parameter by adding a predicted quantization parameter to the delta quantization parameter, wherein the binary-arithmetic-decoding is performed using contexts for the first bin and the other bins, and using no context for the sign bin.

2. An image quantization parameter decoder for decoding a quantization parameter for a video decoding process that is based on context-based adaptive binary arithmetic coding, the image quantization parameter decoder comprising:

a memory storing instructions; and
a processor configured to execute the instructions to:
decode by binary-arithmetic-decoding, a first bin indicating whether or not a delta quantization parameter is significant, other bins, which are subsequent to the first bin, indicating an absolute value of the delta quantization parameter, and a sign bin, which is subsequent to the other bins, indicating whether the delta quantization parameter is positive or negative;
de-binarize the first bin, the other bins and the sign in to generate a delta quantization parameter; and
add a predicted quantization parameter to the delta quantization parameter to generate a re-constructed quantization parameter,
wherein the binary-arithmetic-decoding is performed contexts for the first bin and the other bins, and using no context for the sign bin.

* * * * *

UNITED STATES PATENT AND TRADEMARK OFFICE
CERTIFICATE OF CORRECTION

PATENT NO. : 10,085,025 B2
APPLICATION NO. : 15/655500
DATED : September 25, 2018
INVENTOR(S) : Chono et al.

It is certified that error appears in the above-identified patent and that said Letters Patent is hereby corrected as shown below:

In the Claims

Claim 2, Column 13, Lines 9-10, "decoding is performed contexts for the first bin" should read --decoding is performed using contexts for the first bin--.

Signed and Sealed this
First Day of January, 2019

Andrei Iancu
*Director of the United States Patent and Trademark Office*